(12) United States Patent
Seiler et al.

(10) Patent No.: US 8,932,478 B2
(45) Date of Patent: Jan. 13, 2015

(54) PROCESS FOR THE ABSORPTION OF A VOLATILE SUBSTANCE IN A LIQUID ABSORBENT

(75) Inventors: Matthias Seiler, Griesheim (DE); Bernd Glöckler, Rodenbach (DE); Peter Schwab, Essen (DE); Stefan Kempka, Essen (DE)

(73) Assignee: Evonik Degussa GmbH, Essen (DE)

( * ) Notice: Subject to any disclaimer, the term of this patent is extended or adjusted under 35 U.S.C. 154(b) by 722 days.

(21) Appl. No.: 12/865,787

(22) PCT Filed: Dec. 3, 2008

(86) PCT No.: PCT/EP2008/066684
§ 371 (c)(1),
(2), (4) Date: Aug. 2, 2010

(87) PCT Pub. No.: WO2009/097930
PCT Pub. Date: Aug. 13, 2009

(65) Prior Publication Data
US 2011/0000236 A1    Jan. 6, 2011

(30) Foreign Application Priority Data

Feb. 5, 2008   (EP) .................... 08101296

(51) Int. Cl.
F25B 15/00    (2006.01)
B01D 3/34     (2006.01)
C09K 5/04     (2006.01)

(52) U.S. Cl.
CPC ............... B01D 3/343 (2013.01); C09K 5/047 (2013.01)
USPC .................... 252/68; 62/112; 62/494; 95/141; 95/143; 95/116; 95/46; 96/6

(58) Field of Classification Search
USPC .............. 62/101, 112, 476, 477, 494; 203/42; 252/67, 68; 261/140.2, 148; 422/608; 210/500.21, 200.23, 500.27, 640, 644; 96/3, 10, 11, 12; 95/46, 50
See application file for complete search history.

(56) References Cited

U.S. PATENT DOCUMENTS

| | | |
|---|---|---|
| 1,882,258 A | 10/1932 | Randel |
| 2,516,625 A | 7/1950 | Haury |
| 2,601,673 A | 6/1952 | McMillan et al. |
| 2,802,344 A | 8/1957 | Witherell |
| 3,276,217 A | 10/1966 | Bourne et al. |
| 3,580,759 A | 5/1971 | Albertson et al. |
| 3,609,087 A | 9/1971 | Chi et al. |
| 4,106,904 A | 8/1978 | Oude Alink et al. |
| 4,112,051 A | 9/1978 | Sartori et al. |
| 4,152,900 A | 5/1979 | Chopra et al. |
| 4,152,901 A | 5/1979 | Munters |
| 4,201,721 A | 5/1980 | Hallgren |
| 4,251,494 A | 2/1981 | Say |
| 4,360,363 A | 11/1982 | Ferrin et al. |
| 4,466,915 A | 8/1984 | Lai |
| 4,701,530 A | 10/1987 | Swearingen et al. |
| 4,714,597 A | 12/1987 | Trevino |
| 5,126,189 A | 6/1992 | Tanny et al. |
| 5,186,010 A * | 2/1993 | Wehr ............................. 62/112 |
| 5,303,565 A | 4/1994 | Pravda |
| 5,873,260 A | 2/1999 | Linhardt et al. |
| 6,117,963 A * | 9/2000 | Boinowitz et al. .............. 528/25 |
| 6,130,347 A | 10/2000 | Julius et al. |
| 6,155,057 A | 12/2000 | Angell et al. |
| 6,184,433 B1 * | 2/2001 | Harada et al. .................. 604/372 |
| 6,680,047 B2 | 1/2004 | Klaveness et al. |
| 6,727,015 B1 | 4/2004 | Putter et al. |
| 7,419,646 B2 | 9/2008 | Cadours et al. |
| 7,435,318 B2 | 10/2008 | Arlt et al. |
| 7,827,820 B2 | 11/2010 | Weimer et al. |
| 8,069,687 B2 | 12/2011 | Jork et al. |
| 8,318,117 B2 | 11/2012 | Lichtfers et al. |
| 8,357,344 B2 | 1/2013 | Bouillon et al. |
| 8,500,867 B2 | 8/2013 | Seiler et al. |
| 8,500,892 B2 | 8/2013 | Seiler et al. |
| 8,506,839 B2 | 8/2013 | Shiflett et al. |
| 8,623,123 B2 | 1/2014 | Seiler et al. |
| 2004/0133058 A1 | 7/2004 | Arlt et al. |
| 2005/0070717 A1 | 3/2005 | Wasserscheid et al. |
| 2005/0129598 A1 | 6/2005 | Chinn |
| 2005/0202967 A1 | 9/2005 | Hoefer et al. |
| 2005/0245769 A1 | 11/2005 | Kohler et al. |
| 2006/0104877 A1 | 5/2006 | Cadours et al. |
| 2006/0150665 A1 | 7/2006 | Weimer et al. |
| 2006/0197053 A1 * | 9/2006 | Shiflett et al. .................. 252/67 |
| 2006/0251961 A1 | 11/2006 | Olbert et al. |
| 2007/0144186 A1 | 6/2007 | Shiflett et al. |
| 2007/0264180 A1 | 11/2007 | Carrette et al. |
| 2007/0286783 A1 | 12/2007 | Carrette et al. |
| 2008/0028777 A1 | 2/2008 | Boesmann et al. |
| 2008/0283383 A1 | 11/2008 | Ruffert et al. |
| 2009/0029121 A1 | 1/2009 | Hammermann et al. |
| 2009/0199709 A1 | 8/2009 | Rojey et al. |

(Continued)

FOREIGN PATENT DOCUMENTS

| | | |
|---|---|---|
| DE | 400 488 | 8/1924 |
| DE | 633 146 | 7/1936 |

(Continued)

OTHER PUBLICATIONS

H. Perez-Blanco, "A Model of an Ammonia-Water Falling Film Absorber" 1998, ASHRAE Transaction vol. 4, p. 467-483.*

(Continued)

Primary Examiner — Cheryl J Tyler
Assistant Examiner — Antonio R Febles
(74) Attorney, Agent, or Firm — Law Office of: Michael A. Sanzo, LLC

(57) ABSTRACT

To absorb a volatile substance from a gas phase in a liquid absorbent, the gas phase is brought into contact with a film of an absorbent which comprises an ionic liquid and a wetting-promoting additive. The process can be used in absorption refrigerating machines.

20 Claims, No Drawings

(56) References Cited

U.S. PATENT DOCUMENTS

| | | | |
|---|---|---|---|
| 2010/0011958 A1 | 1/2010 | Cadours et al. | |
| 2010/0028812 A1 | 2/2010 | Agar et al. | |
| 2010/0029519 A1 | 2/2010 | Schwab et al. | |
| 2010/0095703 A1 | 4/2010 | Jork et al. | |
| 2010/0104490 A1 | 4/2010 | Bouillon et al. | |
| 2010/0326126 A1 | 12/2010 | Seiler et al. | |
| 2011/0081287 A1 | 4/2011 | Bouillon et al. | |
| 2012/0011886 A1 | 1/2012 | Shiflett et al. | |
| 2012/0017762 A1 | 1/2012 | Seiler et al. | |
| 2012/0080644 A1 | 4/2012 | Seiler et al. | |
| 2012/0247144 A1 | 10/2012 | Seiler et al. | |
| 2012/0308458 A1 | 12/2012 | Seiler et al. | |
| 2013/0031930 A1 | 2/2013 | Seiler et al. | |
| 2013/0031931 A1 | 2/2013 | Seiler et al. | |
| 2013/0118350 A1 | 5/2013 | Rolker et al. | |
| 2013/0219949 A1 | 8/2013 | Seiler et al. | |
| 2013/0247758 A1 | 9/2013 | Seiler et al. | |

FOREIGN PATENT DOCUMENTS

| | | | | |
|---|---|---|---|---|
| DE | 36 23 680 A1 | 1/1988 | | |
| DE | 266 799 A1 | 4/1989 | | |
| DE | 195 11 709 | 10/1996 | | |
| DE | 103 33 546 | 2/2005 | | |
| DE | 10 2004 053 167 | 5/2006 | | |
| DE | 10 2005 013 030 | 9/2006 | | |
| DE | 10 2006 036228 A1 | 2/2008 | | |
| DE | 10 2009 000 543 | 8/2010 | | |
| EP | 0 033 529 A1 | 1/1981 | | |
| EP | 0 302 020 | 2/1989 | | |
| EP | 2 093 278 A1 | 8/2009 | | |
| FR | 2 898 284 A1 | 9/2007 | | |
| FR | 2 900 841 A1 | 11/2007 | | |
| FR | 2 900 842 A1 | 11/2007 | | |
| JP | 61-129019 | 6/1986 | | |
| JP | 62-73055 | 4/1987 | | |
| JP | 1-134180 | 5/1989 | | |
| JP | 2-298767 | 12/1990 | | |
| JP | 4-268176 | 9/1992 | | |
| JP | 06307730 A | * 11/1994 | ............ | F25B 15/00 |
| JP | 7-167521 | 7/1995 | | |
| JP | 2001-219164 | 8/2001 | | |
| JP | 2004-44945 | 2/2004 | | |
| JP | 2006-239516 A | * 2/2006 | ............ | B01D 53/14 |
| WO | WO 93/13367 | 7/1993 | | |
| WO | WO 00/61698 A1 | 10/2000 | | |
| WO | WO 02/074718 | 9/2002 | | |
| WO | WO 03/074494 | 9/2003 | | |
| WO | WO 2004/104496 | 12/2004 | | |
| WO | WO 2005/113702 | 12/2005 | | |
| WO | WO 2006/084262 | 8/2006 | | |
| WO | WO 2006/134015 | 12/2006 | | |
| WO | WO 2007/070607 | 6/2007 | | |
| WO | WO 2008/015217 | 2/2008 | | |
| WO | WO 2009/098155 | 8/2009 | | |
| WO | WO 2009/156271 | 12/2009 | | |
| WO | WO 2010/089257 A1 | 8/2010 | | |
| WO | WO 2012/062656 | 5/2012 | | |
| WO | WO 2012/062830 | 5/2012 | | |
| WO | WO 2012/168067 | 12/2012 | | |
| WO | WO 2012/168094 | 12/2012 | | |
| WO | WO 2012/168095 | 12/2012 | | |
| WO | WO 2013/050230 | 4/2013 | | |
| WO | WO 2013/050242 | 4/2013 | | |

OTHER PUBLICATIONS

U.S. Appl. No. 13/375,822, filed Dec. 2, 2011, Seiler.
Galán, et al., "Solvent Properties of Functionalized Ionic Liquids for $CO_2$ Absorption," *IChemE* 85(A1):31-39 (2007).
Li, et al., "Correlation and Prediction of the Solubility of $CO_2$ and $H_2S$ in an Aqueous Solution of 2-Piperidineethanol and Sulfolane," *Ind. Eng. Chem. Res.* 37:3098-3104 (1998).
English counterpart of Mitsubishi Heavy Industries, Ltd., "Flue Gas $CO_2$ Recovery Technology and Its Application to EOR: an Effective Strategy for Addressing the Issues of Global Warming and Peaking Oil Supply," vol. 44, p. 20-23 (2007).
U.S. Appl. No. 13/514,167, filed Jun. 6, 2012, Seiler.
English language abstract for JP 1-134180 published on May 26, 1989.
English language abstract for JP 2001-219164 published on Aug. 14, 2001.
English language abstract for JP 2004-44945 published on Feb. 12, 2004.
English language abstract for WO 2013/050230 published on Apr. 11, 2013.
English language abstract for WO 2013/050242 published on Apr. 11, 2013.
Wasserscheid, et al., "Ionische Flüssigkeiten—neue,,Lösungen für die Übergangsmetallkatalyse," *Angewandte Chemie* 112(21):3926-3945 (2000).
Wasserscheid, et al., "Ionic Liquids—New "Solutions" for Transition Metal Catalysis," *Angew. Chem. Int. Ed.* 39:3772-3789 (2000).
Ziegler, et al., "Recent developments and future prospects of sorption heat pump systems," *Int. J. Therm. Sci.* 38:191-208 (1999).
Office Action for co-pending U.S. Appl. No. 12/865,758 mailed May 15, 2013.
Response to Office Action for co-pending U.S. Appl. No. 12/865,758, filed Sep. 2, 2013.
English language translation of Japanese Office Action for counterpart application JP 2010-545368 issued on Apr. 26, 2013.
Office Action for co-pending U.S. Appl. No. 12/865,758 mailed Oct. 7, 2013.
U.S. Appl. No. 13/884,840, filed May 31, 2013, Seiler.
U.S. Appl. No. 13/910,014, filed Jun. 4, 2013, Seiler.
Chua, et al., "Improved Thermodynamic Property Fields of LiBr-$H_2O$ Solution," *International Journal of Refrigeration* 23:412-429 (2000).
Glebov, et al., "Experimental Study of Heat Transfer Additive Influence on the Absorption Chiller Performance," *International Journal of Refrigeration* 25:538-545 (2002).
Kim, et al., "Performance Evaluation of Absorption Chiller Using LiBr+$H_2N(CH_2)_2OH$+$H_2O$, LiBr+$HO(CH_2)_3OH$+$H_2O$, and LiBr+($HOCH_2CH_2NH$+$H_2O$ as Working Fluids," *Applied Thermal Engineering* 19:217-225 (1999).
Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate—Trifluoroethanol," *Fluid Phase Equilibria* 218:215-220 (2004).
Wu, et al., "Novel Ionic Liquid Thermal Storage for Solar Thermal Electric Power Systems," *Proceeding of Solar Forum. Solar Energy: The Power to Choose* Apr. 21-25, 2001.
Yoon, et al., "Cycle Analysis of Air-Cooled Absorption Chiller Using a New Working Solution," *Energy* 24:795-809 (1999).
Ziegler, et al., "Heat-Transfer Enhancement by Additives," *International Journal of Refrigeration* 19:301-309 (1996).
English abstract for reference B1, DE 36 23 680, Jan. 1988.
Kim, et al., "Surface tension and viscosity of 1-butyl-3-methylimidazolium iodide and 1-butyl-3-methylimidazolium tetrafluoroborate, and solubility of lithium bromide+1-butyl-3-methylimidazolium bromide in water," *Korean J. Chem. Eng.* 23(1):113-116 (2006), Jan. 2006.
De Lucas, et al., "Vapor Pressures, Densities, and Viscosities of the (Water+Lithium Bromide+Lithium Formate) System and (Water+Lithium Bromide+Potassium Formate) System," *Journal of Chemical and Engineering Data, American Chemical Society, US* 48(1):18-22 (2003), Dec. 2002.
De Lucas, et al., "Absorption of Water Vapor into Working Fluids for Absorption Refrigeration Systems," *Industrial & Engineering Chemistry Research, American Chemical Society, US* 46(1):345-350 (2007) Dec. 2006.
English language abstract for WO 2008/015217, Feb. 2008.
English language abstract for WO 2012/062830, May 2012.
Preliminary Amendment filed Aug. 2, 2012 for copending U.S. Appl. No. 12/865,758.
U.S. Appl. No. 13/641,591, filed Oct. 16, 2012, Seiler.
U.S. Appl. No. 13/641,692, filed Oct. 16, 2012, Seiler.

(56) References Cited

OTHER PUBLICATIONS

U.S. Appl. No. 13/675,979, filed Nov. 13, 2012, Rolker.
Partial English language translation for JP 62-73055 published on Apr. 3, 1987.
English language translation of JP 7-167521 published on Jul. 4, 1995. (Foreign language document submitted with English language abstract in an IDS filed on Sep. 27, 2010).
Response to Office Action filed Jan. 9, 2014 for copending U.S. Appl. 12/865,758.
U.S. Appl. No. 14/124,347, filed Dec. 6, 2013, Rolker.
U.S. Appl. No. 14/124,385, filed Dec. 6, 2013, Rolker.
U.S. Appl. No. 14/124,472, filed Dec. 6, 2013, Rolker.
International Search Report for PCT/EP2008/066684 filed Dec. 3, 2008.
English translation of the Written Opinion of the International Searching Authority for PCT/EP2008/066684 filed Dec. 3, 2008.
English translation of the International Preliminary Report on Patentability for PCT/EP2008/066684 filed Dec. 3, 2008.
Brennecke, et al., "Ionic Liquids: Innovative Fluids for Chemical Processing," *AIChE Journal* 47(11):2384-2389 (2001).
Ziegler, et al., "Multi-effect absorption chillers," *Rev. Int. Froid* 16(5):301-311 (1993).
English language text for DE 400 488, Aug. 11, 1924.
English language text for DE 633 146, Jul. 20, 1936.
English language abstract for DE 195 11 709, Oct. 2, 1996.
English language abstract for DE 103 33 546, Feb. 17, 2005.
English language abstract for DE 10 2004 053 167, May 4, 2006.
English language abstract for JP 61-129019, Jun. 17, 1986.
English language abstract for JP 2-298767, Dec. 11, 1990.
English language abstract for JP 4-268176, Sep. 24, 1992.
English language abstract for JP 7-167521, Jul. 4, 1995.
English language abstract for WO 93/13367, Jul. 8, 1993.
English language abstract for WO 2009/098155, Aug. 13, 2009.
English language abstract for DE 10 2009 000 543, Aug. 12, 2010.
English language abstract for EP 2 093 278 A1, Aug. 26, 2009.
English language abstract for WO 2012/062656, May 18, 2012.
English language abstract for WO 2012/168067, Dec. 13, 2012.
English language abstract for WO 2012/168094, Dec. 13, 2012.
English language abstract for WO 2012/168095, Dec. 13, 2012.
Office Action mailed Jan. 7, 2013 for co-pending U.S. Appl. No. 12/865,758.
Response to Office Action for co-pending U.S. Appl. No. 12/865,758, filed Mar. 10, 2013.
Domanska, et al., Solubility of 1-Alkyl-3-ethylimidazolium-Based Ionic Liquids in Water and 1-Octanol, *J. Chem. Eng. Data* 53:1126-1132 (Apr. 2008).
Liu, et al., The physical properties of aqueous solution of room-temperature ionic liquids based on imidazolium:Database and Evaluation, *J. Mol. Liquids* 140:68-72 (Jan. 2008).
Zhou, The Vapor Surfactant Theory of Absorption and Condensation Enhancement, *Proc. Int. Sorption Heat Pump Conference*, Sep. 24-27, 2002.
Rolker, et al., "Abtrennung von Kohlendioxid aus Rauchgasen mittels Absorption," *Chemie Ingenieur Technik* 78:416-424 (2006).
Zhang, et al., "Screening of ionic Liquids to Capture $CO_2$ by COSMO-RS and Experiments," *AIChE Journal* 54(10):2171-2728 (Oct. 2008).
English language abstract for DD 266 799 A1, Apr. 12, 1989.
English language abstract for EP 0 033 529 A1, Jan. 31, 1981.
English language abstract for FR 2 900 841 A1, Nov. 16, 2007.
English language translation of abstract for Rolker document, 2006.
U.S. Appl. No. 13/147,198, filed Oct. 9, 2011, Seiler.

\* cited by examiner

PROCESS FOR THE ABSORPTION OF A VOLATILE SUBSTANCE IN A LIQUID ABSORBENT

CROSS REFERENCE TO RELATED APPLICATIONS

The present application is US national stage of international application, PCT/EP2008/066684 which had an international filing date of Dec. 3, 2008, and which was published in German under PCT Article 21(2) on Aug. 13, 2009. Priority is claimed to European application EP 08101296.5, filed on Feb. 5, 2008, which is hereby incorporated by reference in its entirety.

The invention relates to a process for the absorption of a volatile substance from a gas phase in a liquid absorbent which comprises an ionic liquid and a wetting-promoting additive, where the gas phase is brought into contact with a film of the absorbent.

In numerous technical processes, volatile substances are absorbed from a gas phase in a liquid absorbent. Such an absorption is carried out in many separation processes, such as, for example, in extractive distillations, in which the extraction takes place in a rectification column, or in gas purification processes, such as, for example, the removal of carbon dioxide from combustion waste gases, during which the absorption takes place in a gas scrubber. Moreover, such an absorption is also used in absorption refrigerating machines.

In such absorption processes, it is advantageous if the absorbent has only a low vapour pressure and virtually does not pass into the gas phase. Consequently, it has already been proposed to use an ionic liquid as absorbent since ionic liquids have a negligibly low vapour pressure.

WO 02/074718 describes the use of ionic liquids as extractive solvents for extractive distillations.

The use of ionic liquids as absorbents for carbon dioxide is known from J. F. Brennecke and E. J. Maginn, AIChE Journal 47 (2001) 2384-2389.

WO 2005/113702, WO 2006/084262 and WO 2006/134015 describe the use of ionic liquids as absorbents in absorption refrigerating machines.

The inventors of the present invention have now found that the absorption processes known from the prior art which use an ionic liquid as absorbent produce only an inadequate and often also at times fluctuating mass transfer if the absorption takes place in an apparatus in which the gas phase is brought, for the absorption, into contact with a film of the absorbent.

The invention provides a process for the absorption of a volatile substance from a gas phase in a liquid absorbent in which the gas phase is brought into contact with a film of the absorbent and in which the absorbent comprises an ionic liquid and a wetting-promoting additive.

Using the process according to the invention, compared with the processes known from the prior art, a more rapid and, in terms of time, more stable mass transfer is achieved in the absorption, and the absorption can be carried out without problems in smaller apparatuses.

In the process according to the invention, the absorbent comprises at least one ionic liquid and at least one wetting-promoting additive. Preferably, the absorbent comprises one or more ionic liquids in a total amount of from 20 to 99.9% by weight and one or more wetting-promoting additives in a total amount of from 0.01 to 10% by weight.

Within the context of the invention, an ionic liquid is a salt or a mixture of salts of anions and cations, where the salt or the mixture of salts has a melting point of less than 100° C.

Preferably, the ionic liquid consists of one or more salts of organic cations with organic or inorganic anions. Mixtures of two or more salts with different organic cations and the same anion are particularly preferred.

Suitable organic cations are, in particular, cations of the general formulae (I) to (V):

  (I)

  (II)

  (III)

  (IV)

  (V)

in which $R^1$, $R^2$, $R^3$, $R^4$ are identical or different and are hydrogen, a linear or branched aliphatic or olefinic hydrocarbon radical having 1 to 30 carbon atoms, a cycloaliphatic or cycloolefinic hydrocarbon radical having 5 to 40 carbon atoms, an aromatic hydrocarbon radical having 6 to 40 carbon atoms, an alkylaryl radical having 7 to 40 carbon atoms, a linear or branched aliphatic or olefinic hydrocarbon radical having 2 to 30 carbon atoms and interrupted by one or more groups —O—, —NH—, —NR'—, —O—C(O)—, —(O)C—O—, —NH—C(O)—, —(O)C—NH—, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)— or —N(CH$_3$)—S(O$_2$)—, a linear or branched aliphatic or olefinic hydrocarbon radical having 1 to 30 carbon atoms terminally functionalized by OH, OR', NH$_2$, N(H)R' or N(R')$_2$, or a blockwise or randomly composed polyether radical of the formula —(R$^5$—O)$_n$—R$^6$, R' is an aliphatic or olefinic hydrocarbon radical having 1 to 30 carbon atoms, $R^5$ is a linear or branched hydrocarbon radical containing 2 to 4 carbon atoms, n is from 1 to 200, preferably 2 to 60, $R^6$ is hydrogen, a linear or branched aliphatic or olefinic hydrocarbon radical having 1 to 30 carbon atoms, a cycloaliphatic or cycloolefinic hydrocarbon radical having 5 to 40 carbon atoms, an aromatic hydrocarbon radical having 6 to 40 carbon atoms, an alkylaryl radical having 7 to 40 carbon atoms or a —C(O)—R$^7$ radical, $R^7$ is a linear or branched aliphatic or olefinic hydrocarbon radical having 1 to 30 carbon atoms, a cycloaliphatic or cycloolefinic hydrocarbon radical having 5 to 40 carbon atoms, an aromatic hydrocarbon radical having 6 to 40 carbon atoms or an alkylaryl radical having 7 to 40 carbon atoms, where at least one and preferably each of the radicals $R^1$, $R^2$, $R^3$ and $R^4$ is different from hydrogen.

Cations of the formulae (I) to (V) in which the radicals $R^1$ and $R^3$ together form a 4- to 10-membered, preferably 5- to 6-membered, ring are likewise suitable.

Heteroaromatic cations with at least one quaternary nitrogen atom in the ring which carries a radical $R^1$ as defined above, preferably derivatives of pyrrole, pyrazole, imidazole, oxazole, isoxazole, thiazole, isothiazole, pyridine, pyrimidine, pyrazine, indole, quinoline, isoquinoline, cinnoline, quinoxaline or phthalazine substituted on the nitrogen atom are likewise suitable.

Suitable inorganic anions are, in particular, tetrafluoroborate, hexafluorophosphate, nitrate, sulphate, hydrogensulphate, phosphate, hydrogenphosphate, dihydrogenphosphate, hydroxide, carbonate, hydrogencarbonate and the halides, preferably chloride.

Suitable organic anions are, in particular, $R^aOSO_3^-$, $R^aSO_3^-$, $R^aOPO_3^{2-}$, $(R^aO)_2PO_2^-$, $R^aPO_3^{2-}$, $R^aCOO^-$, $R^aO^-$, $(R^aCO)_2N^-$, $(R^aSO_2)_2N^-$ and $NCN^-$ where $R^a$ is a linear or branched aliphatic hydrocarbon radical having 1 to 30 carbon atoms, a cycloaliphatic hydrocarbon radical having 5 to 40 carbon atoms, an aromatic hydrocarbon radical having 6 to 40 carbon atoms, an alkylaryl radical having 7 to 40 carbon atoms or a linear or branched perfluoroalkyl radical having 1 to 30 carbon atoms.

In a preferred embodiment, the ionic liquid comprises one or more 1,3-dialkylimidazolium salts, where the alkyl groups are particularly preferably independently of one another selected from methyl, ethyl, n-propyl, n-butyl and n-hexyl. Particularly preferred ionic liquids are salts of one or more of the cations 1,3-dimethylimidazolium, 1-ethyl-3-methylimidazolium, 1-(n-butyl)-3-methylimidazolium, 1-(n-butyl)-3-ethylimidazolium, 1-(n-hexyl)-3-methylimidazolium, 1-(n-hexyl)-3-ethylimidazolium and 1-(n-hexyl)-3-butylimidazolium with one of the anions chloride, acetate, methylsulphate, ethylsulphate, dimethylphosphate or methylsulphonate.

In a further preferred embodiment, the ionic liquid comprises one or more quaternary ammonium salts with a monovalent anion and cations of the general formula (I) in which $R^1$ is an alkyl radical having 1 to 20 carbon atoms,
$R^2$ is an alkyl radical having 1 to 4 carbon atoms,
$R^3$ is a radical $(CH_2CHRO)_n$—H where n is from 1 to 200 and R═H or $CH_3$ and
$R^4$ is an alkyl radical having 1 to 4 carbon atoms or a radical $(CH_2CHRO)_n$—H where n is from 1 to 200 and R═H or $CH_3$.

Particularly preferred anions are chloride, acetate, methylsulphate, ethylsulphate, dimethylphosphate or methylsulphonate.

Processes for the preparation of the ionic liquids are known to the person skilled in the art from the prior art.

The wetting-promoting additive preferably comprises one or more surfactants from the group of nonionic surfactants, zwitterionic surfactants and cationic surfactants.

Suitable nonionic surfactants are alkylamine alkoxylates, amidoamines, alkanolamides, alkylphosphine oxides, alkyl-N-glucamides, alkyl glucosides, bile acids, alkyl alkoxylates, sorbitan esters, sorbitan ester ethoxylates, fatty alcohols, fatty acid ethoxylates, ester ethoxylates and polyether siloxanes.

Suitable zwitterionic surfactants are betaines, alkylglycines, sultaines, amphopropionates, amphoacetates, tertiary amine oxides and silicobetaines.

Suitable cationic surfactants are quaternary ammonium salts with one or more substituents having 8 to 20 carbon atoms and a melting point of more than 100° C., in particular corresponding tetraalkylammonium salts, alkylpyridinium salts, ester quats, diamidoamine quats, imidazolinium quats, alkoxyalkyl quats, benzyl quats and silicone quats.

In a preferred embodiment, the wetting-promoting additive comprises one or more nonionic surfactants of the general formula $R(OCH_2CHR')_mOH$ where m is from 4 to 40, in which R is an alkyl radical having 8 to 20 carbon atoms, an alkylaryl radical having 8 to 20 carbon atoms or a polypropylene oxide radical having 3 to 40 propylene oxide units and R' is methyl or preferably hydrogen.

In a further preferred embodiment, the wetting-promoting additive comprises a polyether-polysiloxane copolymer which comprises more than 10% by weight of $[Si(CH_3)_2O]$ units and more than 10% by weight of $[CH_2CHR$—$O]$ units, in which R is hydrogen or methyl. Particular preference is given to polyether-polysiloxane copolymers of the general formulae (VI) to (VIII):

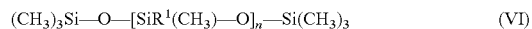  (VI)

  (VII)

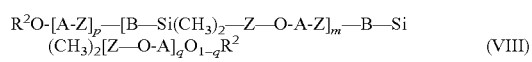  (VIII)

in which
A is a divalent radical of the formula —$[CH_2CHR^3$—$O]_r$—,
B is a divalent radical of the formula —$[Si(CH_3)_2$—$O]_s$—,
Z is a divalent linear or branched alkylene radical having 2 to 20 carbon atoms and is preferably —$(CH_2)_3$—,
n=1 to 30,
m=2 to 100,
p, q=0 or 1,
r=2 to 100,
s=2 to 100;
from 1 to 5 of the radicals $R^1$ are radicals of the general formula —Z—O-A-$R^2$ and the remaining radicals $R^1$ are methyl,
$R^2$ is hydrogen or an aliphatic or olefinic alkyl radical or acyl radical having 1 to 20 carbon atoms and
$R^3$ is hydrogen or methyl.

The wetting-promoting additives are already known to the person skilled in the art from the prior art as additives for aqueous solutions and can be prepared according to processes known from the prior art.

Preferably, ionic liquid and wetting-promoting additive are selected in such a way and in such amounts that the absorbent has a contact angle of less than 140° on a surface of a steel S235JRG2 towards air. The absorbent particularly preferably has a contact angle of less than 130° and in particular of less than 120°. Commercially available measuring instruments can be used for determining the contact angle. Thus, for example, the contact angle can be determined using the drop contour analysis system DSA 100/DSA 100L or the Universal-Surface-Tester GH100, in each case obtainable from KRÜSS GmbH.

The absorbent preferably has a viscosity at 20° C. of from 1 to 15 000 mPa*s, particularly preferably 2 to 3000 mPa*s and in particular 5 to 1000 mPa*s, in each case determined in accordance with DIN 53019.

In the process according to the invention, a gas phase which comprises a volatile substance is brought into contact with a film of the absorbent. Besides the volatile substance, the gas phase can also comprise further substances which are not absorbed. The gas phase can likewise also be a vapour phase which consists essentially only of vapour of the volatile substance.

In the process according to the invention, the film of the absorbent can be generated on any suitable surface, for example on surfaces made of metal, glass, enamel or polymers such as, for example, polyethylene. Preferably, the absorption is carried out with a film of the absorbent on a metal surface since then the heat of absorption which is released during the absorption can be better dissipated and the apparatus used for the absorption can be smaller in design.

In a preferred embodiment of the process, the film of the absorbent is generated in a falling-film apparatus. Apparatuses suitable for this embodiment are known to the person skilled in the art from the area of evaporation technology as falling-film evaporators.

In a further preferred embodiment of the process, the film of the absorbent is generated on a structured packing. Structured packings are known to the person skilled in the art from the field of absorption and distillation technology. The structured packing here can consist of any suitable material, such as metal, ceramic or plastic. Generating the film of the absorbent on a structured packing has the advantage that the absorption can be carried out in apparatuses with a smaller volume. Preference is given to using structured packings of sheet metal or metal fabric with which the apparatus used for the absorption can be designed to be particularly small and light. As an alternative to structured packings, however, it is also possible to use randomly packed beds.

Preferably, in the process according to the invention, the mixture of volatile substance and absorbent obtained during the absorption is brought into contact with a gas phase in a subsequent desorption at an elevated temperature relative to the absorption and/or a reduced pressure relative to the absorption, such that at least some of the volatile substance is desorbed from the mixture and the absorbent remaining after the desorption of the volatile substance is returned to the absorption. This makes it possible for the absorbent to be used several times for the absorption.

In the embodiment with the desorption of the volatile substance, the process is preferably carried out such that the desorption takes place through a membrane which separates the mixture of volatile substance and absorbent from the gas phase into which the volatile substance is desorbed. In this embodiment, it is also possible to use wetting-promoting additives which effect increased foaming of the absorbent without resulting in foam development during the desorption.

In a preferred embodiment of the process according to the invention, the gas phase is an azeotropic mixture of two or more volatile substances with similar boiling points or an azeotropic mixture of two or more volatile substances, where at least one of the substances is preferably absorbed. This embodiment makes it possible to remove an impurity, which is present in the product but difficult to separate off by distillation, in a distillation process through a gas scrubbing of the distillation product obtained in vapour form.

In an alternative embodiment, the absorption is carried out in a rectification column, where the absorbent is preferably introduced close to the top of the column so that it acts like an extractive solvent in the rectification column.

In a further embodiment, the gas phase is a combustion waste gas and the volatile substance is carbon dioxide, so that the process separates carbon dioxide from a combustion waste gas.

In a preferred embodiment of the process according to the invention with additional desorption, the desorption takes place at an increased pressure relative to the absorption, the desorbed volatile substance is condensed at the pressure used for the desorption, the resulting condensate is then evaporated at a pressure which is lower than the pressure of the desorption and is at least as high as the pressure in the absorption, and the gas phase obtained during the evaporation of the condensate is brought into contact with the film of the absorbent. In this embodiment, the volatile substance is preferably water, ammonia or carbon dioxide. Preferably, the gas phase comprises essentially only the volatile substance and no further substances which are not absorbed in the absorbent.

In this embodiment, the process according to the invention is suitable for operation in an absorption refrigerating machine. An absorption refrigerating machine for carrying out this embodiment comprises an absorber, a desorber, an evaporator, a condenser and a working medium of an absorbent and a volatile substance, where the absorber comprises a device for bringing a gas phase containing the volatile substance into contact with a film made of absorbent, and the absorbent comprises an ionic liquid and a wetting-promoting additive. The absorption refrigerating machines according to the invention can be constructed more compactly and allow a higher degree of effectiveness than the absorption refrigerating machines known from the prior art. Furthermore, they are more robust in operation and insensitive towards shocks and vibrations and are therefore better suited for mobile use, e.g. in vehicles and on ships.

Preferably, in an absorption refrigerating machine, a working medium is used which is a mixture of an absorbent and a volatile substance, where the absorbent comprises an ionic liquid and a wetting-promoting additive, and the volatile substance is water, ammonia or carbon dioxide.

EXAMPLES

Several working media according to the present invention suitable for use in an absorption refrigerating machine were prepared and investigated. The composition and also the properties of the working media are shown in Tables 1 and 2. The ionic liquids EMIM chloride (1-ethyl-3-methylimidazolium chloride), EMIM acetate (1-ethyl-3-methylimidazolium acetate), MMIM DMP (1-methyl-3-methylimidazolium dimethylphosphate) and TEGO® IL 2MS (bis(hydroxyethyl) dimethylammonium methanesulphonate) are commercially available under these names from Evonik Goldschmidt GmbH. The corrosion inhibitor REWOCOROS® AC 101 (a modified alkoxylated oleamide) and the wetting-promoting additive TEGOPREN® 5840 (a polyether-modified polysiloxane) are commercially available from Evonik Goldschmidt GmbH. The working media from Tables 1 and 2 were prepared by mixing the respective ionic liquid, the refrigerant water, the corrosion inhibitor REWOCOROS® AC 101 and the wetting-promoting additive TEGOPREN® 5840 in the proportions given in Tables 1 and 2 at 25° C. The contact angle on an S235JRG2 steel surface was determined at 25° C. using a DSA 100/DSA 100L drop contour analysis system.

TABLE 1

| Example | 1* | 2 | 3* | 4 |
|---|---|---|---|---|
| Ionic liquid | EMIM acetate | EMIM acetate | EMIM chloride | EMIM chloride |
| Ionic liquid in % by wt. | 90 | 90 | 90 | 90 |
| Water in % by wt. | 10.0 | 9.4 | 10.0 | 9.4 |
| REWOCOROS ® AC 101 in % by wt. | 0 | 0.5 | 0 | 0.5 |
| TEGOPREN ® 5840 in % by wt. | 0 | 0.1 | 0 | 0.1 |
| Contact angle | 111 | 105 | 117 | 74 |
| Water partial pressure at 35° C. in mbar | 4.4 | 4.5 | 3.9 | 4.0 |

*not according to the invention

TABLE 2

| Example | 5* | 6 | 7* | 8 |
|---|---|---|---|---|
| Ionic liquid | MMIM DMP | MMIM DMP | TEGO ® IL 2MS | TEGO ® IL 2MS |
| Ionic liquid in % by wt. | 90 | 90 | 90 | 90 |
| Water in % by wt. | 10.0 | 9.4 | 10.0 | 9.4 |
| REWOCOROS ® AC 101 in % by wt. | 0 | 0.5 | 0 | 0.5 |
| TEGOPREN ® 5840 in % by wt. | 0 | 0.1 | 0 | 0.1 |

TABLE 2-continued

| Example | 5* | 6 | 7* | 8 |
|---|---|---|---|---|
| Contact angle | 96 | 60 | 108 | 104 |
| Water partial pressure at 35° C. in mbar | 5.1 | 5.3 | 15.2 | 15.4 |

*not according to the invention

The invention claimed is:

1. A process for the absorption of a volatile substance from a gas phase in a liquid absorbent, comprising bringing said gas phase into contact with a film of said absorbent, wherein said absorbent comprises:
   a) an ionic liquid; and
   b) a wetting-promoting additive, wherein said wetting-promoting additive is a zwitterionic surfactant or a nonionic surfactant selected from the group consisting of: alkylamine alkoxylates, amidoamines, alkanolamides, alkylphosphine oxides, alkyl-N-glucamides, alkyl glucosides, bile acids, alkyl alkoxylates, sorbitan esters, sorbitan ester ethoxylates, fatty acid ethoxylates, ester ethoxylates and polyether siloxanes.

2. The process of claim 1, further comprising:
   a) bringing a mixture of volatile substance and absorbent formed during said absorption into contact with a gas phase in a subsequent desorption, wherein said subsequent desorption is carried out at an elevated temperature and/or a reduced pressure relative to said absorption, and wherein said contact between said mixture and said gas phase results in at least some of said volatile substance being desorbed from said mixture; and
   b) returning the absorbent remaining after the desorption of the volatile substance to the absorption.

3. The process of claim 2, wherein said desorption takes place through a membrane which separates the mixture of volatile substance and absorbent from the gas phase into which the volatile substance is desorbed.

4. The process of claim 2, wherein:
   a) said desorption takes place at an increased pressure relative to the absorption;
   b) the desorbed volatile substance is condensed at the pressure used for the desorption and the resulting condensate is then evaporated at a pressure which is lower than the pressure of the desorption and at least as high as the pressure in the absorption; and
   c) the gas phase obtained during the evaporation of the condensate is brought into contact with the film of the absorbent.

5. The process of claim 4, wherein the volatile substance is water, ammonia or carbon dioxide.

6. The process of claim 4, wherein said process is carried out using an absorption refrigerating machine comprising an absorber, a desorber, an evaporator, a condenser and a working medium of an absorbent and a volatile substance, wherein the absorber comprises a device for bringing a gas phase containing the volatile substance into contact with a film made of absorbent, and wherein said absorbent comprises an ionic liquid and a wetting-promoting additive.

7. The process of claim 1, wherein said absorbent comprises one or more ionic liquids in a total amount of from 20 to 99.9% by weight and one or more wetting-promoting additives in a total amount of from 0.01 to 10% by weight.

8. The process of claim 1, wherein said absorbent has a contact angle of less than 140° on a surface of a steel S235JRG2 towards air.

9. The process of claim 1, wherein said ionic liquid consists of salts of organic cations with organic or inorganic anions.

10. The process of claim 1, wherein said ionic liquid comprises one or more 1,3-dialkylimidazolium salts.

11. The process of claim 1, wherein said ionic liquid comprises one or more quaternary ammonium salts of the general formula $R^1R^2R^3R^4N^+A^-$, in which:
   $R^1$ is an alkyl radical having 1 to 20 carbon atoms,
   $R^2$ is an alkyl radical having 1 to 4 carbon atoms,
   $R^3$ is a radical $(CH_2CHRO)_n$—H where n is from 1 to 200 and R=H or $CH_3$,
   $R^4$ is an alkyl radical having 1 to 4 carbon atoms or a radical $(CH_2CHRO)_n$—H where n is from 1 to 200 and R=H or $CH_3$ and
   $A^-$ is a monovalent anion.

12. The process of claim 1, wherein the wetting-promoting additive comprises one or more nonionic surfactants of the general formula $R(OCH_2CH_2)_mOH$, where m is from 4 to 40, in which R is an alkyl radical having 8 to 20 carbon atoms, an alkylaryl radical having 8 to 20 carbon atoms or a polypropylene oxide radical having 3 to 40 propylene oxide units.

13. The process of claim 1, wherein the wetting-promoting additive comprises a polyether-polysiloxane copolymer which comprises more than 10% by weight of $[Si(CH_3)_2O]$ units and more than 10% by weight of $[CH_2CHR—O]$ units, in which R is hydrogen or methyl.

14. The process of claim 1, wherein the absorption is carried out with a film of said absorbent on a metal surface.

15. The process of claim 1, the film of the absorbent is generated in a falling-film apparatus.

16. The process of claim 1, wherein the film of said absorbent is generated on a structured packing.

17. The process of claim 16, wherein said structured packing is a structured packing of sheet metal or metal fabric.

18. The process of claim 1, wherein the gas phase is an azeotropic mixture of two or more volatile substances and at least one of the substances is selectively absorbed.

19. The process of claim 1, wherein the absorption is carried out in a rectification column.

20. The process of claim 1, wherein the gas phase is a combustion waste gas and the volatile substance is carbon dioxide.

* * * * *